(12) United States Patent
Rainisto

(10) Patent No.: US 7,720,044 B1
(45) Date of Patent: May 18, 2010

(54) SYSTEM AND METHOD FOR TERMINAL CONFIGURATION

(75) Inventor: Jonni Rainisto, Tampere (FI)

(73) Assignee: Nokia Corporation, Espoo (FI)

( * ) Notice: Subject to any disclaimer, the term of this patent is extended or adjusted under 35 U.S.C. 154(b) by 1303 days.

(21) Appl. No.: 10/126,247

(22) Filed: Apr. 19, 2002

(51) Int. Cl.
*H04L 12/56* (2006.01)
*G06F 15/16* (2006.01)

(52) U.S. Cl. .................. 370/349; 370/389; 709/203

(58) Field of Classification Search .................. 370/338, 370/328, 349, 254, 310, 351; 379/59; 455/41.1, 455/11.1; 713/168, 183; 709/245, 229, 225, 709/221
See application file for complete search history.

(56) References Cited

U.S. PATENT DOCUMENTS

| | | | |
|---|---|---|---|
| 5,835,061 A | 11/1998 | Stewart | |
| 6,070,246 A | 5/2000 | Beser | |
| 6,330,231 B1* | 12/2001 | Bi | 370/328 |
| 6,353,599 B1* | 3/2002 | Bi et al. | 370/328 |
| 6,359,711 B1 | 3/2002 | Cole et al. | |
| 6,885,362 B2* | 4/2005 | Suomela | 345/156 |
| 6,952,578 B1* | 10/2005 | Pedersen et al. | 455/414.2 |
| 6,961,762 B1* | 11/2005 | Yeap et al. | 709/221 |
| 2002/0013844 A1* | 1/2002 | Garrett et al. | 709/225 |
| 2002/0023160 A1* | 2/2002 | Garrett et al. | 709/229 |
| 2002/0023174 A1* | 2/2002 | Garrett et al. | 709/245 |
| 2002/0157007 A1* | 10/2002 | Sashihara | 713/183 |
| 2003/0039240 A1* | 2/2003 | Sutanto | 370/352 |
| 2003/0174682 A1* | 9/2003 | Barker, Jr. | 370/338 |
| 2004/0037270 A1* | 2/2004 | Mercuriali et al. | 370/352 |
| 2004/0205233 A1* | 10/2004 | Dunk | 709/238 |

FOREIGN PATENT DOCUMENTS

| | | |
|---|---|---|
| EP | 0 987 860 A2 | 3/2000 |
| WO | WO 98/26530 | 6/1998 |

OTHER PUBLICATIONS

R. Droms, "RFC 1541, Dynamic Host Configuration Protocol", Oct. 1993.
M. Patrick, "RFC 3046, DHCP Relay Agent Information Option". Jan. 2001.
European Search Report for European Patent Application No. 03251864.9.

\* cited by examiner

*Primary Examiner*—Gregory B Sefcheck
(74) *Attorney, Agent, or Firm*—Locke Lord Bissell & Liddell LLP

(57) ABSTRACT

Systems and methods for providing network configuration information and/or additional information to terminals. A central administration server may, for example, determine the network configuration and/or additional information to be provided to a terminal. In some cases, the information provided depends on one or more factors. The data provided may, for instance, include terminal IP address, netmask, gateway address, WAP (wireless application protocol) gateway address, landing page, advertisement information, and service group identifiers. A terminal wishing to receive network connectivity from an access point may, for example, request such from the access point.

46 Claims, 4 Drawing Sheets

_US 7,720,044 B1_

SYSTEM AND METHOD FOR TERMINAL CONFIGURATION

FIELD OF INVENTION

This invention relates to systems and methods for data provision.

BACKGROUND INFORMATION

In recent years, there has been an increase in the use of wireless technologies such as Bluetooth and IEEE 802.11b. In one aspect, there has been a increase in devices that support these technologies. Such devices include wireless terminals, personal computers, and PDA's.

In another aspect, these technologies are being employed with increasing frequency in various locations to provide network connectivity to devices. For example, 802.11b and Bluetooth access points may be found in bookstores, libraries, coffee shops, and many other locations.

Accordingly, there may be increased interest in technologies that make use of these wireless technologies.

SUMMARY OF THE INVENTION

According to embodiments of the present invention, there are provided systems and methods for providing network configuration information and/or additional information to terminals. In certain embodiments, the information provided depends on one or more factors.

DETAILED DESCRIPTION OF THE INVENTION

Overview

Figure 1:
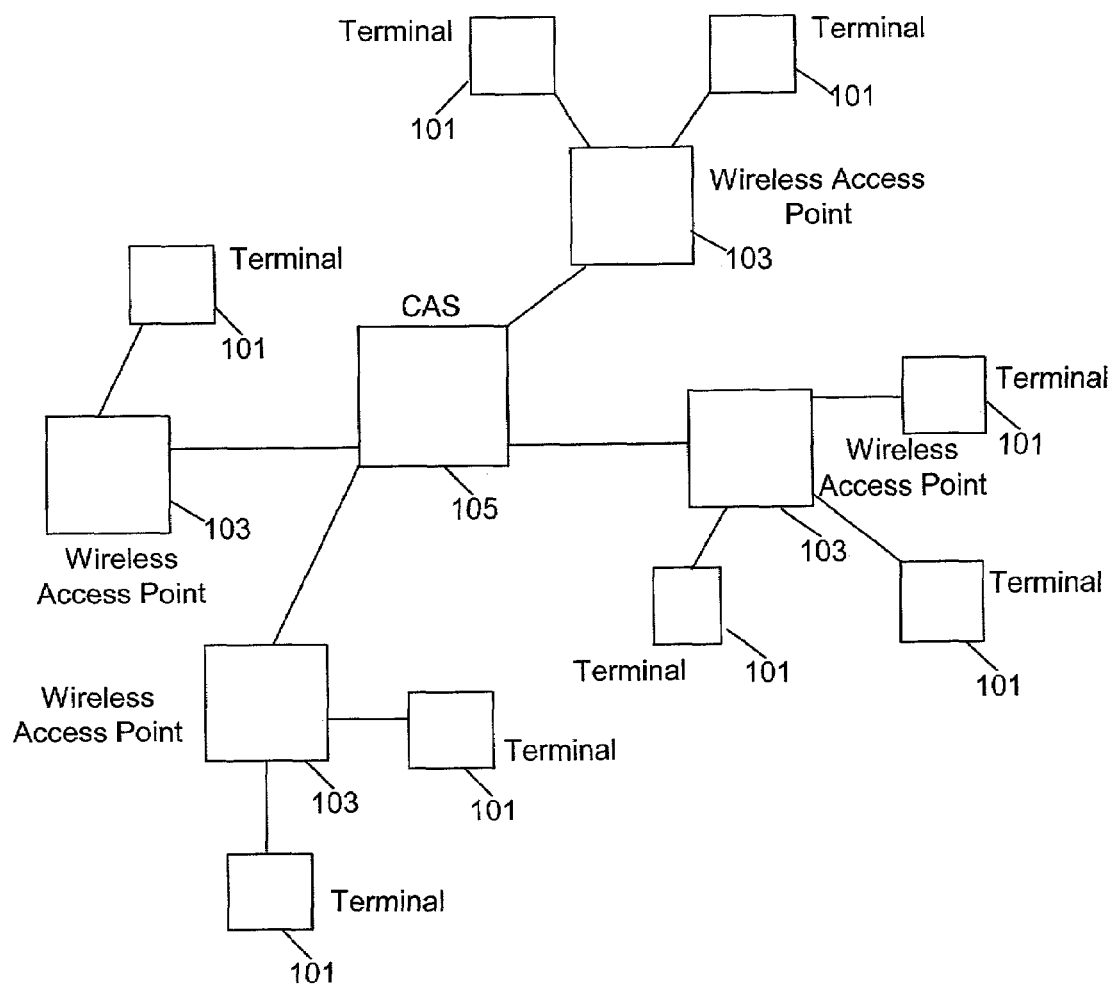
FIG. 1 shows exemplary network topology according to embodiments of the present invention.

According to embodiments of the present invention, there are provided systems and methods for providing network configuration information and/or additional information to a wireless terminal coming in range of, in communication with, and/or establishing communication with a wireless access point. The wireless access point could be, for example, a Bluetooth or 802.11b base station. Shown in FIG. 1 is an exemplary network topology according to embodiments of the present invention wherein there are a plurality of wireless terminals 101, a plurality of wireless access points 103, and a central administration server (CAS) 105. The CAS of this exemplary embodiment is in communication with each of the wireless access points 103. Each access point of this exemplary embodiment, is in turn, in communication with one or more wireless terminals 101. The CAS may be, for example, a centrally-located general purpose computer. Although only one CAS is shown here, certain embodiments may include multiple CAS's.

A CAS may determine the network configuration and/or additional information to be provided to a terminal. The determination may depend on the identity of the terminal, the identity of the access point with which the terminal communicates, and/or other factors. The data provided may include terminal IP address, netmask, gateway address, WAP (wireless application protocol) gateway address, landing page, advertisement information, and service group identifiers. A CAS may additionally create status reports relating to the activities of itself, terminals, and or access points.

A terminal wishing to receive network connectivity from an access point may request such from the access point. The terminal may do this, for example, when entering the communications range of the access point. Similarly, an access point may offer network connectivity to a terminal. In either case, once any appropriate permissions have been given, steps might be first taken to establish lower-layer connectivity between the terminal and access point. Next, the terminal may take steps to receive network configuration and/or additional information.

Similarly, a terminal already receiving network connectivity through an access point may take steps to receive network configuration and/or additional information.

Lower-Layer Connection Establishment

A Bluetooth wireless access point wishing to provide network connectivity to a Bluetooth-equipped wireless terminal may first send a message to the terminal offering such connectivity. In certain embodiments, the terminal might automatically send a message to the access point accepting the offer. In other embodiments, the terminal could first learn if its user wished to receive such connectivity. The terminal could learn its user's desire, for example, by presenting an appropriate GUI (graphical user interface) box to the user. The terminal could then send a message to the access point indicating the user's desire. It is noted that in the case where the user indicates that she does not wish to receive the network connectivity that the terminal may, instead of indicating this to the base station, provide no response.

Upon receiving an indication that the terminal's user did not desire the offered network connectivity, the access point could terminate its attempt to provide network connectivity. The access point could similarly terminate its attempt if it did not receive a response from the terminal in a predetermined amount of time. In such a case the access point might repeat its offer one or more times before abandoning the attempt.

The access point could support protocols such as PAN (Personal Area Networking) and LAP (Local area network Access Protocol). Accordingly, upon receiving an acceptance message from the terminal, the access point could query the terminal to learn if the terminal supports any of the protocols that the access point supports. In certain embodiments, the query could be an SDP (service description Protocol) query, and the response could be in accordance with terminal's SDP service records. In certain embodiments, the terminal might automatically answer the query. In other embodiments, the terminal might require its user's permission before answering the query.

In the case where the query response indicates that access and terminal share only one protocol in common (e.g., PAN), that protocol could be employed. In the case where the query response indicates that the terminal supports no protocol supported by the access point, the access point may terminate its attempt to provide network connectivity. In the case where the terminal supports more than one protocol supported by the access point (e.g., both PAN and LAP), the access point may take steps to determine which of these to employ. In certain embodiments, the access point may preferentially choose certain protocols over the others. Thus the access point might be implemented to choose PAN over LAP. In other embodiments, the terminal might be queried as to which protocol should be employed. The terminal, in turn, might ask its user which protocol is desired, and could forward the user's choice to the access point. The access point could then act in accordance with the user's decision. In still other embodiments, the terminal might preferentially choose certain protocols over others, or be designed to query a central server or system administrator in order to learn which should be employed.

Once a decision has been made to employ a particular protocol (e.g., PAN), an L2CAP (Logical Link and Application Control) connection between the terminal and the access point may be established. Next, lower-layer connectivity appropriate to the chosen protocol could be established. For example, in the case where LAP is the chosen or only available connection, a PPP (Point-to-Point Protocol) connection could next be established. As another example, in the case where PAN is the chosen or only available connection, a BNEP (Bluetooth Network Encapsulation Protocol) connection could next be established.

As noted above, in certain embodiments, instead of the access point initiating communications, the terminal may initiate communications. Accordingly, a Bluetooth-equipped wireless terminal coming in range of and/or wishing to establish network connectivity via a Bluetooth wireless access point may first send a message to the access point requesting a connection with the access point. In certain embodiments, the access point might automatically send a message to the terminal agreeing to the connection. In other embodiments, the access point may query a central server or system administrator in order to learn if it should allow the terminal to connect. The access point could then inform the terminal of the decision. In certain embodiments the terminal's request to connect could include a unique identifier corresponding to the terminal or its user, and this unique identifier could be passed to the central server or system administrator for potential user in deciding whether or not the access point should allow the terminal to connect. In certain embodiments, the unique identifier could be the terminal's 48-bit globally-unique IEEE Bluetooth address.

Upon receiving an indication that a connection is not allowable, the terminal could terminate its attempt to secure network connectivity. The terminal could similarly terminate its attempt if it did not receive a response from the access point in a predetermined amount of time. In the case where no response it received, the terminal might repeat its request one or more times before abandoning the attempt.

Once the terminal received an acceptance message from the access point, the terminal could query the access point to learn if it supported terminal-supported protocols such as PAN and LAP. The access point could respond in a manner analogous to that described above, the access point could response in a manner analogous to that described above. In a manner also analogous to that described above, a protocol supported by both the access point and terminal could be selected. In a manner further analogous to that described above, an L2CAP connection could next be established. Finally, in a manner analogous to that described above, lower-layer connectivity could be established. Thus if PAN was the protocol employed, lower-layer connectivity using BNEP could be established.

It is emphasized that although Bluetooth, PAN, LAP, BNEP, PPP and the like have been used here to illustrate by way of example, other protocols may be employed. For example, 802.11b and associated protocols might be used in place of Bluetooth and associated protocols just described.

Figure 2:
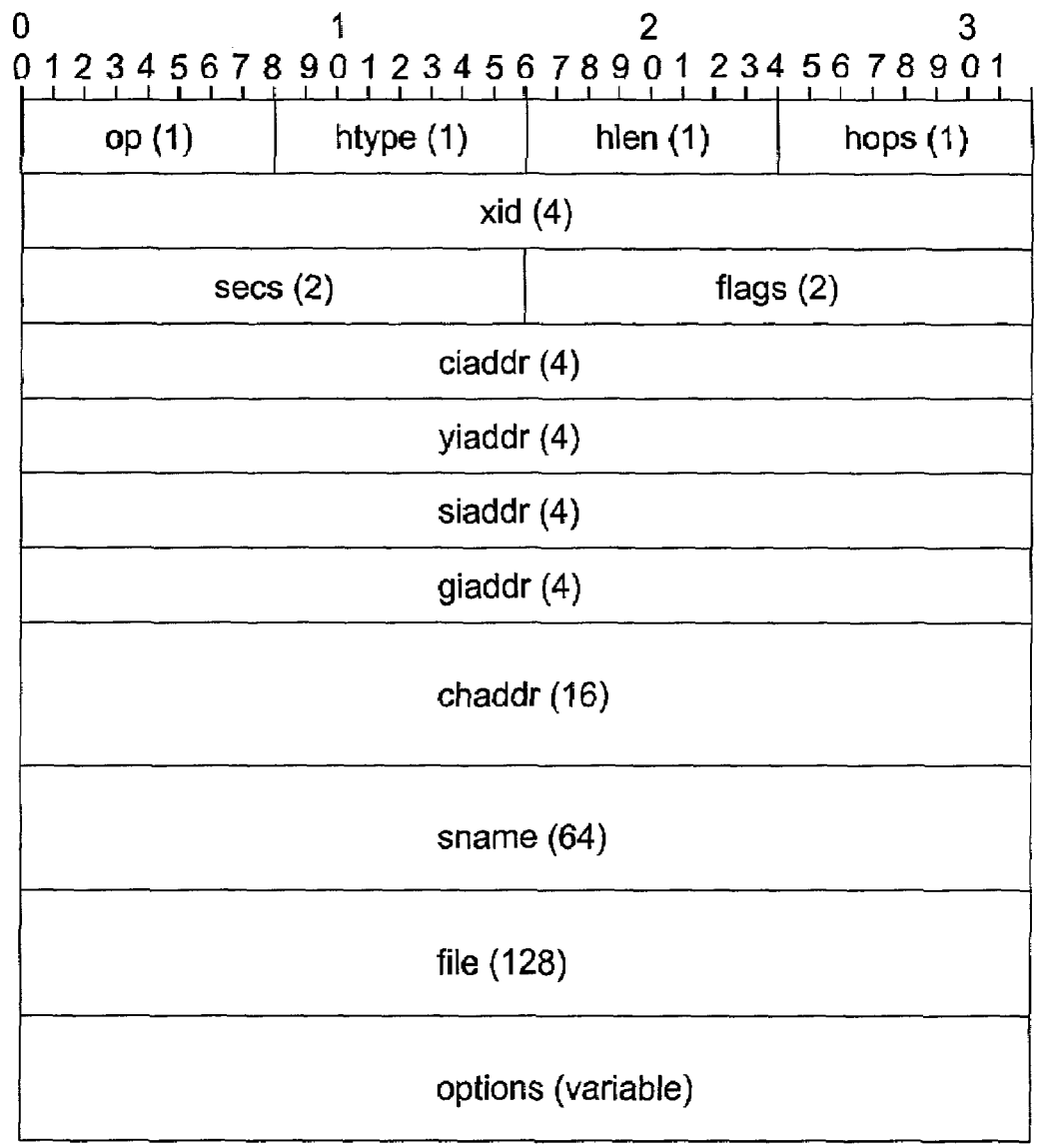
FIG. 2 is an exemplary depiction of the format of a DHCP message.

Terminal Receipt of Network Configuration Information and/or Additional Information A terminal that has previously-established or newly-established BNEP, LAP, or similar lower-layer connectivity may take steps to request network configuration information and/or additional information. In certain embodiments, DHCP (dynamic host configuration protocol) may be employed to make the request. The format of a DHCP message is shown in FIG. 2. Shown in the figure are various message fields, the parenthetical number after each field name indicating the length of the field in octets. DHCP, its associated messages, and its associated message fields are known in the art, and are described in RFC (Request For Comments) 2131, incorporated herein by reference.

Accordingly, in the case where DHCP is employed and a terminal wishes to receive new network configuration and/or additional information, the terminal may dispatch a DHCPDISCOVER message to the wireless access point with which it has communications. The terminal may wish to receive new network configuration and/or additional information, for example, directly after commencing communication with an access point, after changing its physical location by at least a predetermined amount, or after being instructed that it may no longer use previously-received values for network configuration and/or additional information. The location could be determined, for example, based on the location of the access point with which the terminal is connected, or by a GPS (global positing system) unit incorporated into the terminal.

Included in the DHCPDISCOVER message may be one or more indicators of the terminal's identity. The indicators may be placed, for instance, in the chaddr ("client hardware address"), "client identity", and/or other fields of the message. For example, the globally-unique MAC (Media Access Control) or Bluetooth address of the terminal may be placed in the message's chaddr field. As another example, the name of the terminal's owner and/or current user may be placed in the client identity" field. The terminal may also include in the DHCPDISCOVER message suggestions for network configuration and/or additional information. For example, the terminal might suggest the continued use of a previously-assigned IP address. The terminal might do this, for instance, when moving from the service area of one access point to the service area of another access point. Such suggestions could be placed, for example, in DHCP "option" fields. In certain embodiments, an access point might also make such suggestions.

Upon receipt of the DHCPDISCOVER message, the access point could modify the message to further include one or more indicators of the access point's identity. The indicators may be placed, for example, in the giaddr and/or other fields of the DHCPDISCOVER message. In some embodiments, the indication may be the access point's IP address, and may be placed in the message's giaddr ("relay agent IP address") field. After modifying the DHCPDISCOVER message, the access point may forward that message to a central administration server (CAS).

Upon receipt of the DHCPDISCOVER message, the receiving CAS may determine network configuration information and/or additional information for the terminal, perhaps attempting to secure for the terminal values that it suggested. The details of determining such information will be described in greater detail below. The CAS may next create a DHCPOFFER message including the network configuration information and/or additional information. This information could be placed, for example, in the DHCP "option" fields of the message. The message may further include any terminal and/or access point identifiers that were included in the DHCP discover message. The DHCPOFFER message may also include an identifier corresponding to the CAS. The DHCPOFFER message may be sent from the CAS to the access point, which could in turn forward it to the terminal. Terminal identifier information included in the message may be used by the access point in the forwarding.

Upon receipt of the DHCPOFFER message, the terminal may indicate that it wishes to accept the offered network configuration and/or additional information by creating a DHCPREQUEST message. The DHCPREQUEST message may include in the chaddr, "client identifier", and/or other fields an identifier corresponding to the terminal. Also included in the message may be an identifier corresponding to the CAS. The message may be dispatched from the terminal to the access point, which could in turn forward it to the CAS. The access point may add to the message an identifier corresponding to itself before forwarding the message. Such an identifier may be placed, for example, in the giaddr field. In certain embodiments, the terminal may receive DHCPOFFER messages from multiple CAS's and may choose to accept only one of the offerings.

Upon receipt of the DHCPREQUEST message, the CAS may produce a DHCPACK message verifying that the terminal may use the previously-offered network configuration and/or additional information. In certain embodiments, the message may specify certain network configuration and/or additional information. The CAS might forward the message to the access point, which could in turn forward it to the terminal. Upon receipt of the message, the terminal could proceed to operate with the previously-offered network configuration and/or additional information, and/or any network configuration and/or additional information included in the DHCPREQUEST. The DHCPACK message might additionally include a indication of how long the terminal may use the network configuration and/or additional information before needing to query the CAS as to whether it should continue use of the information. This may be expressed, for example, as a "lease" indication in the DHCPACK message.

In the case where the CAS does not wish the terminal to proceed with the previously-offered network configuration and/or additional information, the CAS might create a DHCPNAK message instead of a DHCPACK message. The CAS could pass this message to the access point, which could in turn forward it to the terminal. Upon receipt of the message the terminal could restart the new network configuration and/or additional information request process by sending out a DHCPDISCOVER message as described above.

As noted above, in the process of receiving new network configuration and/or additional information, a terminal may receive a DHCPACK message including an indication of when it needs to query the CAS as to whether it should continue use of the information. Accordingly, at or shortly before the time for querying, the terminal may dispatch a DHCPREQUEST message to the wireless access point with which it is communicating. The terminal might perform such an operation, for example, in the case where it has remained in communication with a single access point long enough that the query time has arrived. On the other hand, a terminal communicating with a first access point but, before query time, switching to a second access point, might not perform the operation.

The DHCPREQUEST may include the network configuration and/or additional information last received by the terminal. This information could be placed, for example, in DHCP "option" fields. The DHCPREQUEST message may also include in the chaddr, "client identity", and/or other fields of the message an indicator corresponding to the terminal. The identifier may be, for example, the terminal's Bluetooth address. Further included in the message may be an indication of the CAS to which the message is to be forwarded. The CAS may be, for example, the one from which the terminal had received network configuration and/or additional information.

Upon receipt of the DHCPREQUEST message, the access point could modify the message to further include one or more indicators of the access point's identity. The indicators may be placed, for example, in the giaddr and/or other fields of the message. After modifying the DHCPREQUEST message, the access point may forward the message to a central administration server (CAS).

Upon receipt of the DHCPREQUEST message, the CAS could determine if there were new and/or updated network configuration information and/or additional information for the terminal. The details of determining such information will be described in greater detail below.

In the case where there is no new and/or updated network configuration information and/or additional information for the terminal, the CAS may create a DHCPACK message to indicate that the terminal should continue to use the previously-received network configuration and/or additional information. The DHCPACK message may additionally include another indication of how long the terminal may use the network configuration and/or additional information before needing to again query the CAS as to whether it should continue use of the values. The DHCPACK message could be sent from the CAS to the access point, which could in turn pass it to the terminal. Upon receiving the message, the terminal could act to continue use of the values until the newly-stated query time.

In the case where the CAS determines that there are new values, the CAS may create a DHCPNAK message and send it to the access point, which could in turn forward it to the terminal. Upon receiving the message, the terminal could commence the above-described process for receiving new network configuration and/or additional information.

Determination of Network Configuration Information and/or Additional Information A. General As noted above, a CAS may determine network configuration information and/or additional information for a terminal, in some cases attempting to provide values suggested by the terminal. As further noted above, the CAS may make use of the identity of the terminal, the identity of the wireless access point with which the terminal is in communication, or both in making the determination. The identity of the terminal may, for example, be employed to access the profile of the terminal's user and/or owner, and the identity of the access point may, for example, be employed to know the location of the terminal. Other factors may be taken into account as well. As previously described, the CAS may learn of these identities, for example, through the reception of one or more messages.

In certain embodiments of the invention, the CAS may maintain and/or have access to a set of rules relating factors such as terminal and/or wireless access point identity with network configuration information and/or additional information. In some cases, the rules would be created by individuals such as system administrators. In other cases, the rules might be created by general purpose computers or similar devices. In some cases, rules could be created on the fly. For example, a rule corresponding to a particular terminal and a particular access point might be created automatically when the two establish communications with one another.

For example, suppose "1236" was an identifier uniquely corresponding to an access point that provided connectivity to terminals located in the organic foods section of a particular supermarket. Under such circumstances, a system administrator or the like might define the following rule that matches based on a particular access point identifier:

RULE 0323:

If TermID=any AND AccessID=1236, THEN:

IPAddress=automatic

Netmask=255.255.0.0

Gateway=128.2.2.2

WAPGateway=128.1.1.1

ServiceGroup=19

LandingPage=www.hypotheticalmart.com/organics.html

Advertisement=www.hypotheticalmart.com/coupons.asp?2323

For this example, "www.hypotheticalmart.com/coupons.asp?2323" may correspond to an advertisement containing a coupon for a particular organic food product, and "www.hypotheticalmart.com/organics.html" may correspond to a landing page containing information about the supermarket's organic foods section. The "Service Group" indication may be employed for various purposes determined by a system administrator or the like. For example, to determine the content items that the terminal will be able to receive. The "automatic" indication will be described in more detail below. Furthermore, although only a single advertisement and only a single landing page URL are specified, multiple advertisements and landing pages may be specified. In certain embodiments, other elements may be specified in multiples as well.

As another example, suppose "1832" was an identifier uniquely corresponding to a particular wireless terminal. Under such circumstances, a system administrator or the like might define the following rule that matches based on a particular terminal:

RULE 0986:

If TermID=1832 AND AccessID=any, THEN:

IPAddress=208.4.5.6

Netmask=255.255.0.0

Gateway=208.1.2.5

WAPGateway=208.2.2.2

Service Group=63

LandingPage=www.hypotheticalnewscenter.com/personalnews.asp?0226

Advertisement=www.hypotheticacomputercorp.com/advertisements/offers.asp?0123

For this example, "www.hypotheticalnewscenter.com/personalnews.asp?0226" may correspond to a landing page containing news stories thought to be of interest to the terminal's owner, while "www.hypotheticacomputercorp.com/advertisements/offers.asp?0123" may correspond to an advertisement containing a special offer thought to be of interest to the terminal's owner. Accordingly, there might be a database associating users with items, concepts, or the like known to, thought to and/or determined to be of interest to those users. Such a database may additionally or alternately categorize users according to, for example, items or concepts of interest to the users.

As yet another example, suppose "8888" was an identifier uniquely corresponding to a particular terminal and "6000" was an identifier uniquely corresponding to the printer section of a particular office store selling computer printer supplies. Under such circumstances, one might define the following rule that matches based on both a particular terminal identifier and a particular access point identifier:

RULE 1008:

If TermID=8888 AND AccessID=6000, THEN:

IPAddress=automatic

Netmask=255.255.0.0

Gateway=87.1.1.3

WAPGateway=87.2.2.2

LandingPage=www.hypotheticalofficestore.com/smith-printercorp/mode13233/supplies Advertisement=www.hypotheticalofficestore.com.smith printercorp/offers/coupon.asp?8088

Wherein, for this example, the specified "LandingPage" may correspond to a page containing information about supplies available at the store for the model of printer (3233) owned by the owner of the terminal whose identifier is "8888". Further, the specified "Advertisement" may correspond to a coupon for a particular one of the supplies listed on the landing page. The printer model could be know to the rule's creator, for example, through consultation of databases and/or purchase records correlating the terminal's identifier, the terminal's owner, and the printer owned by that person.

It is noted that while identifiers such as "1236" have been used for ease of explanation, actual implementations might likely use more complex identifiers such as MAC addresses and Bluetooth identifiers.

B. Group Definition

The above examples have showed rules that match based on a particular terminal and/or access point identifier. However, rules might also match based on a terminal group and/or an access point group.

For example, there may be a rule including:

If TermID=any AND AccessID=Group:UpperWestSide_Subway, THEN:

Group "UpperWestSide_Subway" might, for example, be defined to include the identities of all access points located in subway stations in Manhattan's Upper West Side. Groups could be defined, for example, by system administrators.

A CAS determining the applicability of a rule employing a group could learn of a group's definition, for example, by consulting a store holding such definitions. Thus a CAS might be able to query such a store to learn of all access point identities associated with a particular access point group. Alternately or additionally, a CAS might be able to query such a store to learn if a specified access point or terminal was a member of a specified group.

As alluded to above, groups could be similarly defined to correspond to terminals and to include a number of terminal identifiers. Thus, for example, a particular terminal group "PickupOwners" could include the identities of all terminals owned by people who also own full-size pickups.

It is specifically noted that groups could be defined such that an access point or terminal could belong to one or more groups. For example, groups could be defined such that an access point could belong to both the group "UpperWestSide_ Subway" and the group "LargeMetroSubway". "UpperWestSide_Subway" could be defined as above, while "LargeMetroSubway" might be defined to include the identities of all access points located in subway stations in major cities. Accordingly, a particular access point identity might be included in the definition of each.

C. Automatic Determination

In certain embodiments, rules specifications may not include specific indications for all network configuration and/or additional information. For example, as noted above, a particular rule might include:

IPAddress=automatic

This line could indicate to the CAS that, rather than assigning a particular IP address to a terminal when the rule is applied, the IP address should be determined automatically. The CAS could be programmed to understand automatic assignment to include consulting a pool of assignable IP addresses, choosing one of them to assign to the terminal, and removing the number from the pool. Such operations could be performed, for example, in compliance with DHCP standards.

As noted above, a terminal or access point may act to forward to a CAS suggestions for network configuration and/or additional information. For example, a terminal might make a suggestion concerning assigned IP address in hopes of continuing to use a previously-assigned IP address. Accordingly, in certain embodiments, rule specifications may indicate that a CAS should try to grant terminal and/or access point suggestions for network configuration and/or additional information items. For example, a particular rule might include the line:

IPAddress=automatic, AttemptGrantDesired=Yes

According to certain embodiments, this line might indicate to a CAS that it should attempt to grant a suggested IP address, and if this is not possible, or if no suggestion is received, that it should grant an address determined automatically as described above.

As another example, a particular rule might include the line:

IPAddress=automatic OR AttemptGrantDesired=Yes

According to certain embodiments, this line might indicate to the CAS that it should attempt to grant a suggested IP address if one is suggested, and only perform automatic determination if one is not suggested it should grant one determined automatically as described above. The line might further indicate that the CAS should return an error if it can not grant a suggested IP address.

Although the functionality regarding automatic determination and attempting to grant suggested parameters has been described with referenced to IP addresses, it is specifically noted that this is for purposes of explanation only and that the functionality can be applied to other parameters as well.

D. Time Restriction

According to certain embodiments of the invention, a rule might include an indication of the time or times at which the rule is applicable. In certain cases, a rule might be applicable on a repeating basis. For example, a particular rule might be specified to be applicable every weeknight from 8 pm-10 pm. Accordingly, the specification of a particular rule might include:

RULE 8080:

If TermID=any AND AccessID=Group:UpperWestSide_Subway AND TimeInRange(20:00-22:00), THEN:

In other cases, a rule might be specified to be applicable on a non-repeating basis such that it is only applicable at one or more contiguous or non-contiguous times. For example, a particular rule might be specified to be applicable on Jan. 31, 2003 between 9 am and 11 am, and between 6 pm and 8 pm. Accordingly, the specification of a particular rule might include:

RULE 8112:

If TermID=any AND AccessID=Group:UpperWestSide_Subway AND (TimeInRange(Jan31/2003/09:00-Jan31/2003/11:00) OR TimeInRange(Jan31/2003/18:00-Jan31/2003/20:00)), THEN:

In certain embodiments, rules that did not include a time specification would be considered to be applicable at all times.

In certain cases, two or more rules with time specifications may complement each other such that one is applicable when the other one is not. For example, one rule might be specified to be applicable on weekdays while its complementary rule might be specified to be applicable on weekdays.

E. Conflict Resolution

It is conceivable that, under certain circumstances, more than one rule could meet the criteria for applicability. For example, suppose one rule included:

If TermID=any AND AccessID=Group:UpperWestSide_Subway, THEN:, while another rule included:

If TermID=any AND AccessID=Group:LargeMetroSubway, THEN:, with the groups being defined as above. In the case where an access point was located in an Upper West Side subway station, the criteria for both rules could be met.

In certain situations such as these, it may be desired that only one rule whose criterion is met be applied in response to a request for network configuration and/or additional information. This may be the case, for example, for rules that individually provide all needed network configuration and/or additional information.

In other situations, it may be allowable that more than one of the rules whose criterions are met be applied in response to a request for network configuration and/or additional information. This may be the case, for example, for rules that individually provide only a portion of all needed network configuration and/or additional information. However, in such situations it might be desired that only one rule of a particular type be applied. For example, it might be desired that only one rule of the type providing a landing page be applied at a time, or that only one rule of the type providing network configuration be applied at a time. Accordingly, for situations where only rule is to be applied, or where only one rule of a particular type is to be applied, one or more schemes may be employed to determine which rule will be applied when more than one rule matches.

As alluded to by at least some of the exemplary rules above, rules may include rule numbers such as "8080". According to certain embodiments, rule numbers such as these could be employed to, when the criteria for more than one rule is met, determine which rule will be applied when more than one rule matches. For example, a CAS could be programmed so that the rule with the lowest rule number would be applied. Alternately, the CAS might be programmed so that the rule with the highest number would be applied.

For such embodiments, system administrators or the like creating rules might be able to choose the numbers for the rules, and in doing so might bear in mind how rule number relates to how rules are applied. Thus if preference were given to lower-numbered rules, a system administrator might take care to assign a lower number to a rule that he wished to have priority over a higher-numbered rule. The system administrator or the like might additionally be able to change the numbers of existing rules. This functionality could be useful not only to change the relative priorities of existing rules, but also to allow a rule to have a priority midway between two existing consecutively-numbered rules. Thus if two consecutively-numbered rules were numbered "1000" and "1001", the second of the two could be renumbered as "1002" so that a new rule could be given number "1001" and have priority midway between the two initially-existing rules.

Figure 3:
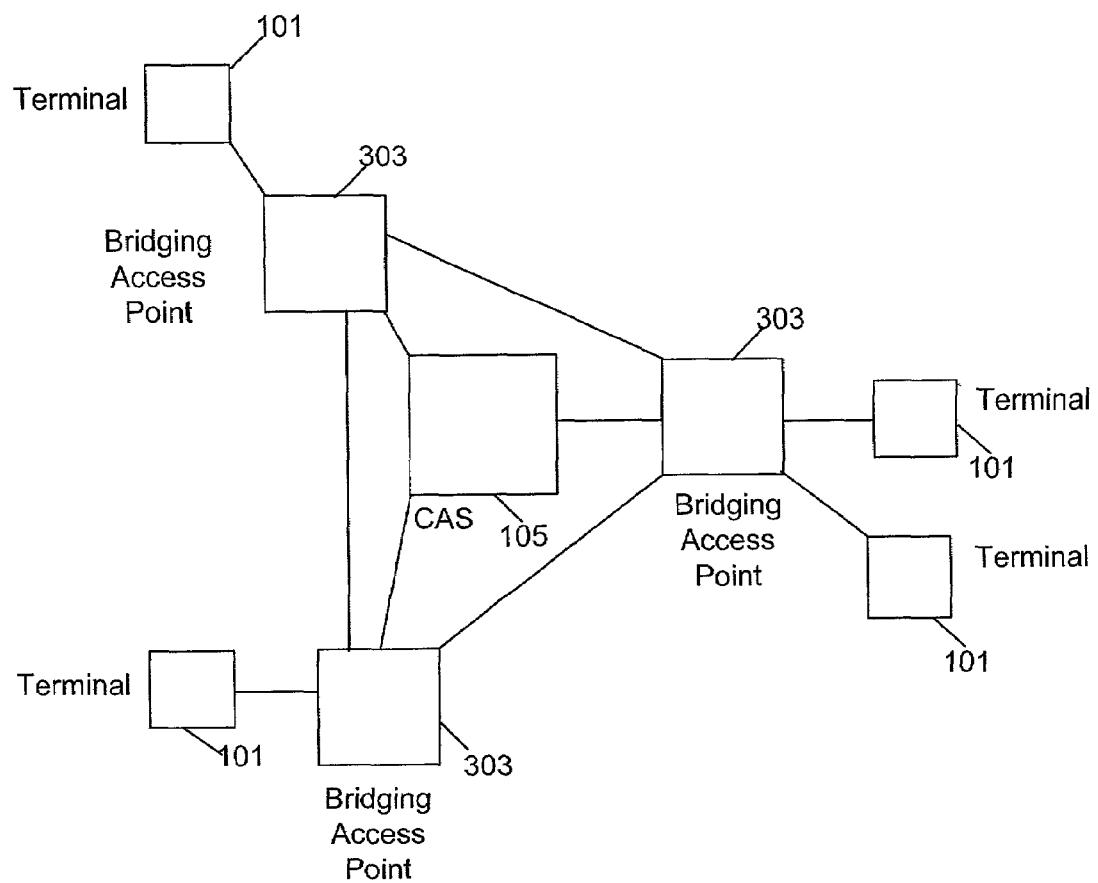
FIG. 3 shows an alternate exemplary network topology according to embodiments of the present invention.

In certain embodiments, a CAS of other general purpose computer could automatically handle rule numbering. In such embodiments, a system administrator or the like could enter a rule, but not specify a rule number. The CAS or other computer could search a store for existing rules that could conflict with the newly-entered rule, that is rules whose criteria could be conceivably met while also meeting the criteria for the newly-entered rule. The computer could then ask the administrator to state the relative priority of the newly-entered rule compared to the potentially-conflicting rules. In response to the administrator's indications, the computer could assign an appropriate rule number to the newly-entered rule, changing the numbers assigned to existing rules as necessary. Such embodiments might additionally allow the administrator to specify the relative priority of existing rules when not entering a new rule Access Point Bridging Functionality In certain embodiments of the invention one or more access points may be configured to provide network bridge functionality, whereby network bridges may be established between one or more of the service areas of the access points. Shown in FIG. 3 is an exemplary network topology where such bridging access points 303 are employed. In this figure each access point 303 is shown as having direct access to CAS 105, but in alternate embodiments only certain access points would have such direct access. In such embodiments, access points lacking direct access could access the CAS by way of an access point having direct access. Although only one CAS is shown here, it is possible for there to be more than one CAS. Similarly, there may be more or less terminals than are shown in the figure.

The operation in embodiments such as that shown in FIG. 3 would be similar to that described above, but an access point might not modify a DHCP message to include an identifier corresponding to the access point. Instead, a terminal could include in a dispatched DHCP message an identifier corresponding to the access point with which it has established communications. The identifier could be, for example, the Bluetooth and/or MAC address of the access point. A terminal could learn of an access point's Bluetooth and/or MAC address, for example, during the establishment of a PAN connection with the access point. The identifier could be placed, for example, in the "client identifier" field of a DHCP message.

Accordingly, in such embodiments a terminal could provide an identification of itself in the chaddr field of a DHCP message, and an identification of the access point with which it communicated in the client identifier field of the message. A CAS receiving such a message could therefore know the identity of both the terminal and the access point with which the terminal has established communications, and would be able to use this information as described above.

Hardware and Software

As alluded to above, certain aspects of the present invention involve the use of computers, and certain procedures and the like described herein may be executed by or with the help of computers. The phrases "computer", "general purpose computer", and the like, as used herein, refer but are not limited to a processor card smart card, a media device, a personal computer, an engineering workstation, a PC, a Macintosh, a PDA, a wired or wireless terminal, a server, a network access point, or the like, perhaps running an operating system such as OS X, Linux, Darwin, Windows CE, Windows XP, Palm OS, Symbian OS, or the like, perhaps with support for Java or .Net.

Figure 4:
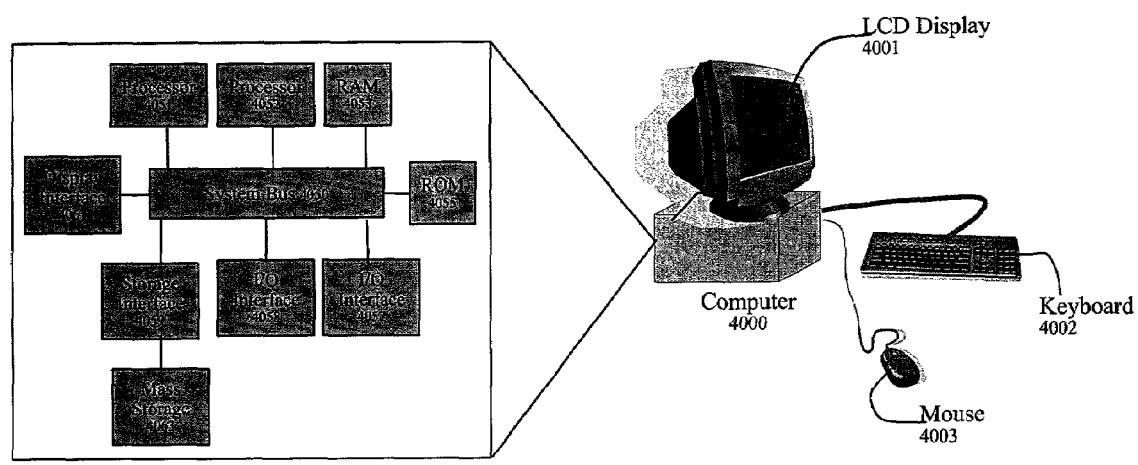
FIG. 4 shows an exemplary general purpose computer involved with embodiments of the present invention.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 4000 as shown in FIG. 4 includes system bus 4050 which operatively connects two processors 4051 and 4052, random access memory (RAM) 4053, read-only memory (ROM) 4055, input output (I/O) interfaces 4057 and 4058, storage interface 4059, and display interface 4061. Storage interface 4059 in turn connects to mass storage 4063. Each of I/O interfaces 4057 and 4058 may be an Ethernet, IEEE 1394, IEEE 802.11b, Bluetooth, or other interface known in the art. Mass storage 4063 may be a hard drive, optical drive, or the like. Processors 4057 and 4058 may each be a commonly known processor such as an IBM or Motorola PowerPC, an AMD Athlon, an AMD Hammer, an Intel StrongARM, or an Intel Pentium. Computer 4000 as shown in this example also includes an LCD display unit 4001, a keyboard 4002 and a mouse 4003. In alternate embodiments, keyboard 4002 and/or mouse 4003 might be replaced with a touch screen, pen, or keypad interface. Computer 4000 may additionally include or be attached to card readers, DVD drives, or floppy disk drives whereby media containing program code may be inserted for the purpose of loading the code onto the computer.

In accordance with the present invention, a computer may run one or more software modules designed to perform one or more of the above-described operations, the modules being programmed using a language such as Java, Objective C, C, C#, or C++ according to methods known in the art.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A method, comprising:
receiving at an access point a dynamic host configuration protocol request from a wireless terminal connected to the access point via a short-range communication connection, said request including a terminal identifier of the terminal;
modifying, at the access point, said dynamic host configuration protocol request to further include an access point identifier of the access point;

sending, from the access point, the modified dynamic host configuration protocol request to an information provider; and receiving at the access point, in response to the modified dynamic host configuration protocol request, a dynamic host configuration protocol response including information for the terminal, wherein the information comprises advertisement information relating to one or more services and network configuration information including a gateway address through which the one or more services can be accessed, and wherein selection of said information for the terminal takes into account both the terminal identifier and said access point identifier.

2. The method of claim 1, wherein said access point identifier is the access point's Internet protocol (IP) address.

3. The method of claim 1, wherein said information includes landing page.

4. The method of claim 1, wherein said information includes wireless application protocol gateway information.

5. The method of claim 1, wherein said information includes terminal Internet protocol (IP) address.

6. The method of claim 1, wherein said information includes terminal service group identifier.

7. The method of claim 1, further comprising having the terminal initiate communications between the terminal and the access point.

8. The method of claim 1, further comprising having the access point initiate communications between the terminal and the access point.

9. The method of claim 1, wherein said information includes location dependent information.

10. The method of claim 1, wherein said information includes time dependent information.

11. An apparatus, comprising:
at least one processor; and
at least one memory including computer program code, the at least one memory and the computer program code configured to, with the at least one processor, cause the apparatus at least to perform:
receive, at an information provider, from an access point a dynamic host configuration protocol request including an access point identifier of the access point, said dynamic host configuration protocol request further including a terminal identifier of a wireless terminal, connected to the access point via a short-range communication connection, that dispatched via dynamic host configuration protocol to the access point;
select, at the information provider, information for the terminal, wherein the information comprises advertisement information relating to one or more services and network configuration information including a gateway address through which the one or more services can be accessed, and wherein the selection of said information for the terminal takes into account both the terminal identifier and said access point identifier; and
send, from the information provider, a dynamic host configuration protocol response including said information for the terminal.

12. The apparatus of claim 11, wherein said access point identifier is the access point's Internet protocol (IP) address.

13. The apparatus of claim 11, wherein said information includes landing page.

14. The apparatus of claim 11, wherein said information includes wireless application protocol gateway information.

15. The apparatus of claim 11, wherein said information includes terminal Internet protocol (IP) address.

16. The apparatus of claim 11, wherein said information includes terminal service group identifier.

17. The apparatus of claim 11, wherein the terminal initiates communications between the terminal and the access point.

18. The apparatus of claim 11, wherein the access point initiates communications between the terminal and the access point.

19. The apparatus of claim 11, wherein said information includes location dependent information.

20. The apparatus of claim 11, wherein said information includes time dependent information.

21. A method, comprising:
receiving at a central administration server a dynamic host configuration protocol request transmitted by a wireless terminal in communication with an access point, said dynamic host configuration protocol request including a terminal identifier of the terminal, said dynamic host configuration protocol request further including an access point identifier of the access point;
selecting, at the central administration server, information for the terminal, wherein the information comprises advertisement information relating to one or more services and network configuration information including a gateway address through which the one or more services can be accessed, and wherein the selection of said information for the terminal takes into account both the terminal identifier and said access point identifier; and
sending, from the central administration server, a dynamic host configuration protocol response including said information for the terminal.

22. The method of claim 21, wherein said access point identifier is the access point's Bluetooth address.

23. The method of claim 21, wherein said access point identifier is the access point's media access control (MAC) address.

24. The method of claim 21, wherein said information includes landing page.

25. The method of claim 21, wherein said information includes wireless application protocol gateway information.

26. The method of claim 21, wherein said information includes terminal Internet protocol (IP) address.

27. The method of claim 21, wherein said information includes terminal service group identifier.

28. The method of claim 21, further comprising having the terminal initiate communications between the terminal and the access point.

29. The method of claim 21, further comprising having the access point initiate communications between the terminal and the access point.

30. The method of claim 21, wherein said information includes location dependent information.

31. The method of claim 21, wherein said information includes time dependent information.

32. An apparatus, comprising:
at least one processor; and
at least one memory including computer program code, the at least one memory and the computer program code configured to, with the at least one processor, cause the apparatus at least to perform:
receive, at an information provider, from a wireless terminal a dynamic host configuration protocol request including a terminal identifier of the terminal, said dynamic host configuration protocol request further including an access point identifier of an access point with which the terminal communicates;

select, at the information provider, information for the terminal, wherein the information comprises advertisement information relating to one or more services and network configuration information including a gateway address through which the one or more services can be accessed, and wherein the selection of said information for the terminal takes into account both the terminal identifier and said access point identifier; and send, from the information provider, a dynamic host configuration protocol response including said information for the terminal.

33. The apparatus of claim 32, wherein said access point identifier is the access point's Bluetooth address.

34. The apparatus of claim 32, wherein said access point identifier is the access point's media access control (MAC) address.

35. The apparatus of claim 32, wherein said information includes landing page.

36. The apparatus of claim 32, wherein said information includes wireless application protocol gateway information.

37. The apparatus of claim 32, wherein said information includes terminal Internet protocol (IP) address.

38. The apparatus of claim 32, wherein said information includes terminal service group identifier.

39. The apparatus of claim 32, wherein the terminal initiates communications between the terminal and the access point.

40. The apparatus of claim 32, wherein the access point initiates communications between the terminal and the access point.

41. The apparatus of claim 32, wherein said information includes location dependent information.

42. The apparatus of claim 32, wherein said information includes time dependent information.

43. A computer program product comprising computer executable program code recorded on a computer readable storage medium, the computer executable program code comprising:
   code for causing receipt at an access point of a dynamic host configuration protocol request from a wireless terminal connected to the access point via a short-range communication connection, said request including a terminal identifier of the terminal;
   code for causing modification, at the access point, of said dynamic host configuration protocol request to further include an access point identifier of the access point;
   code for causing sending, from the access point, of the modified dynamic host configuration protocol request to an information provider; and
   code for causing receipt at the access point, in response to the modified dynamic host configuration protocol request, of a dynamic host configuration protocol response including information for the terminal, wherein the information comprises advertisement information relating to one or more services and network configuration information including a gateway address through which the one or more services can be accessed, and
   wherein selection of said information for the terminal takes into account both the terminal identifier and said access point identifier.

44. A computer program product comprising computer executable program code recorded on a computer readable storage medium, the computer executable program code comprising:
   code for causing receipt at a central administration server of a dynamic host configuration protocol request transmitted by a wireless terminal in communication with an access point, said dynamic host configuration protocol request including a terminal identifier of the terminal, said dynamic host configuration protocol request further including an access point identifier of the access point;
   code for causing selection, at the central administration server, of information for the terminal, wherein the information comprises advertisement information relating to one or more services and network configuration information including a gateway address through which the one or more services can be accessed, and wherein the selection of said information for the terminal takes into account both the terminal identifier and said access point identifier; and
   code for causing sending, from the central administration server, of a dynamic host configuration protocol response including said information for the terminal.

45. An apparatus, comprising:
   at least one processor; and
   at least one memory including computer program code, the at least one memory and the computer program code configured to, with the at least one processor, cause the apparatus at least to perform:
   receive at an access point a dynamic host configuration protocol request from a wireless terminal connected to the access point via a short-range communication connection, said request including a terminal identifier of the terminal;
   modify, at the access point, said dynamic host configuration protocol request to further include an access point identifier of the access point;
   send, from the access point, the modified dynamic host configuration protocol request to an information provider; and
   receive at the access point, in response to the modified dynamic host configuration protocol request, a dynamic host configuration protocol response including information for the terminal, wherein the information comprises advertisement information relating to one or more services and network configuration information including a gateway address through which the one or more services can be accessed, and
   wherein selection of said information for the terminal takes into account both the terminal identifier and said access point identifier.

46. An apparatus, comprising:
   at least one processor; and
   at least one memory including computer program code, the at least one memory and the computer program code configured to, with the at least one processor, cause the apparatus at least to perform:
   receive at a central administration server a dynamic host configuration protocol request transmitted by a wireless terminal in communication with an access point, said dynamic host configuration protocol request including a terminal identifier of the terminal, said dynamic host configuration protocol request further including an access point identifier of the access point;
   select, at the central administration server, information for the terminal, wherein the information comprises advertisement information relating to one or more services and network configuration information including a gateway address through which the one or more services can be accessed, and wherein the selection of said information for the terminal takes into account both the terminal identifier and said access point identifier; and
   send, from the central administration server, a dynamic host configuration protocol response including said information for the terminal.

* * * * *